US008086803B2

(12) United States Patent
Muthiah et al.

(10) Patent No.: US 8,086,803 B2
(45) Date of Patent: Dec. 27, 2011

(54) MANAGING CACHE ELEMENTS

(75) Inventors: Muthu Annamalai Muthiah, Bangalore (IN); Jayesh V Rane, Pune (IN); Sanket S Sangwikar, Kalyan (IN)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/464,951

(22) Filed: May 13, 2009

(65) Prior Publication Data

US 2010/0293335 A1 Nov. 18, 2010

(51) Int. Cl.
*G06F 12/00* (2006.01)
(52) U.S. Cl. .................. 711/133; 711/125; 711/141
(58) Field of Classification Search .............. 711/133, 711/125, 141, 146, 135; 709/213–216
See application file for complete search history.

(56) References Cited

U.S. PATENT DOCUMENTS

| | | | |
|---|---|---|---|
| 6,769,048 B2 | 7/2004 | Goldberg et al. | |
| 7,213,109 B1 * | 5/2007 | Bauman et al. | 711/133 |
| 7,321,953 B2 | 1/2008 | Thomas et al. | |
| 2004/0128346 A1 | 7/2004 | Melamed et al. | |

OTHER PUBLICATIONS

Beomseok Nam, et al., "Periodic Polling for Web Cache Consistency", pp. 1-5, Department of Computer Science, Seoul National University, Seoul, Korea.

* cited by examiner

*Primary Examiner* — David Lam
(74) *Attorney, Agent, or Firm* — Matthew W. Baca

(57) ABSTRACT

A method for managing cache elements in an environment based on Common Information Model is described. Cache elements in the cache are associated with a time attribute and historical data. Cache elements having a time attribute lying in a certain range are polled for from the server and updated at predetermined time points. A new time attribute is calculated for each cache element based on its historical data and this new time attribute assists in adapting the polling frequency for the cache element to its importance and change characteristics. Asynchronous notifications from the server preempt the polling based on the time attribute for a cache element and instead, polling for the cache element is based on the asynchronous notification. A system for cache management includes a client and a server, the client having a cache that is managed based on each cache element's importance and change characteristics.

16 Claims, 6 Drawing Sheets

MANAGING CACHE ELEMENTS

TRADEMARKS

IBM® is a registered trademark of International Business Machines Corporation, Armonk, N.Y., U.S.A. Other names used herein may be registered trademarks, trademarks or product names of International Business Machines Corporation or other companies. Microsoft® and Windows® is a registered trademark of Microsoft Corporation

TECHNICAL FIELD

Embodiments of the invention relates to managing a cache in a client server environment, and more specifically, to the management of a client cache in a system employing the Common Information Model (CIM).

BACKGROUND

As networks grow larger with an ever-expanding cluster of peripherals, associated software, and network connections, they must all be managed efficiently in order to ensure a well-organized system. Because the role of a system administrator has become increasingly complex, the industry has responded with Web Based Enterprises Management (WBEM), a solution including standards for management applications, which allow exchange of management data irrespective of the underlying protocol, operating system, management standard, or associated vendor. A prevalent standard of implementation of WBEM is the Common Information Model (CIM), used for systems management in a client server environment.

CIM is a distributed, hierarchical, object-oriented system management model representing different aspects of a managed entity in separate but related objects. Because this is a distributed object-oriented model, in order to represent a single entity in a server or storage, the client needs to retrieve and assemble all the required data. The client makes numerous requests to the server, and due to the much dispersed nature of the object model, the result is a performance penalty that affects the response time of the management applications. One way to alleviate the performance degradation of management client responses is to implement caching at the CIM client layer.

As with any cache, the CIM client cache needs to be kept consistent with the server state. Two general approaches have been proposed to accomplish that result—a continuous polling mechanism to synchronize the client and server state, or receiving asynchronous notifications that can be employed to update the client state. Both methods, however, have inherent disadvantages. On one hand, a dispersed object model requires frequent polling, which can lead to increased expense as well as overutilization of system and network resources. On the other hand, asynchronous notifications are an unreliable tool to maintain cache coherency because they offer no guarantee of delivery, or correct order of delivery. Those issues create potential risks, as the loss of critical asynchronous notifications or their out-of-order delivery would lead to an invalid cache.

Currently known solutions poll periodically for all data stored in the cache in order to keep any client side cache consistent. As a result, an excessive number of periodic requests are made to the server because of the much distributed nature of the object data. These attempted solutions place excessive demands on network bandwidth, computational power, memory, and latency.

SUMMARY

According to one embodiment of the present invention, a method for managing a cache in a system based on the Common Information Model is described. A client cache contains cache elements, each of which maintains a data value and a time attribute. The method involves tracking historical data relating to each cache element. A server is polled at predetermined time points to obtain new data values for cache elements having a time attribute value that lies in a selected value range. The cache elements that are polled for are updated with new data values from the server. The time attribute carried by each cache element is recalculated based on the historical data and the time attribute of the cache element. Besides polling, a cache element may be updated on receiving an asynchronous notification. The asynchronous notification preempts the polling for the cache element based on its time attribute value, and instead polls for the cache element based on the asynchronous notification.

Another embodiment of the present invention is a system for cache management based on the Common Information Model. The system is based in a client server environment, the server having a memory that includes data elements. The client has a cache which fetches data elements from the server as and when needed. The cache stores multiple cache elements, each of which maintains a data element and a time attribute. A processor tracks historical data relating to each cache element and also sets up a polling thread at predetermined time points to obtain new values of data elements from the server. Polling is performed for cache elements having a time attribute value that lies in a selected range. The cache elements that are polled for are updated. The processor also recalculates the time attribute for each cache element based on its historical data and time attribute. Besides polling, a cache element may be updated on receiving an asynchronous notification by the processor. The asynchronous notification preempts the polling for the cache element based on its time attribute value and instead polls for the cache element based on the asynchronous notification.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
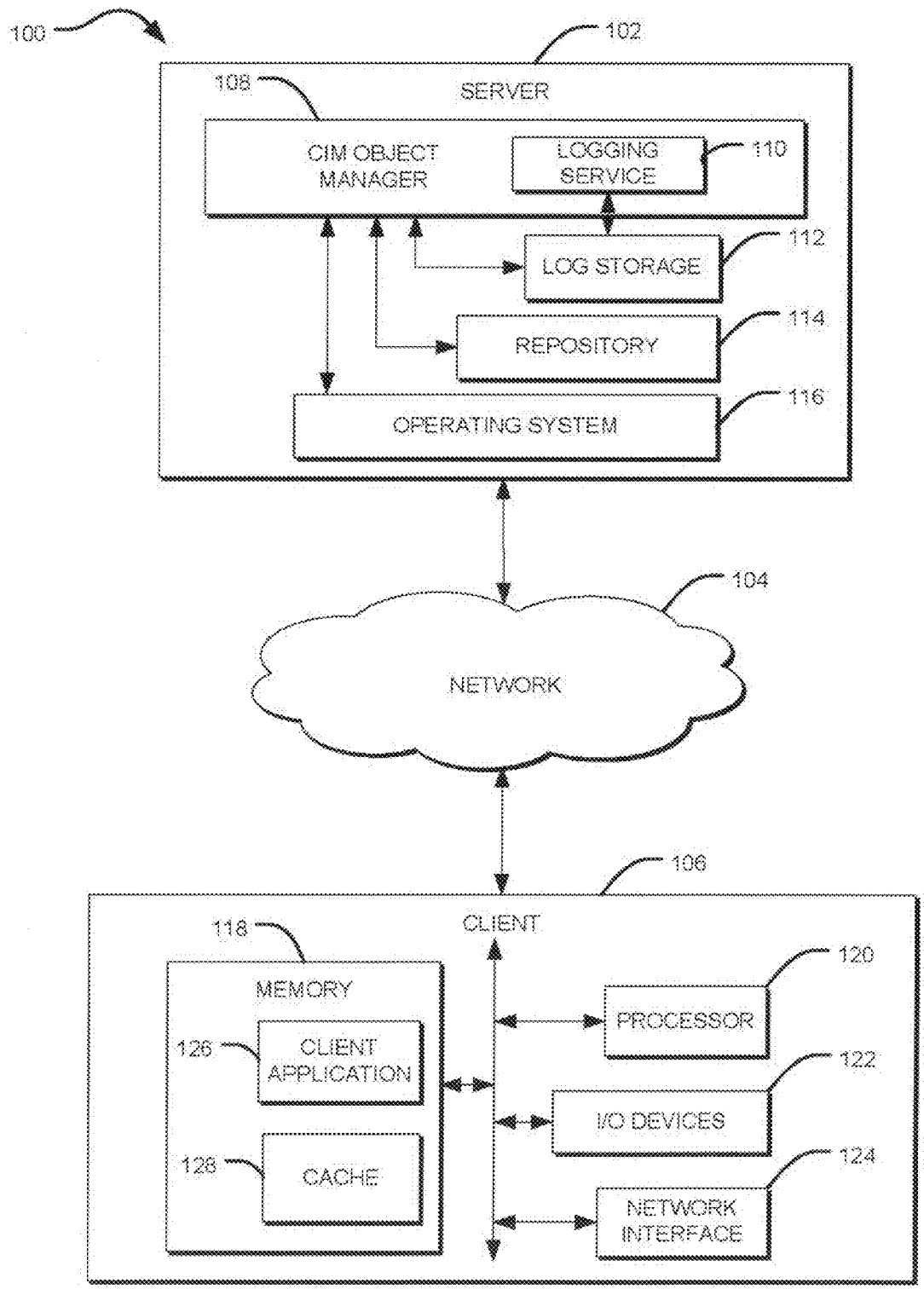
FIG. 1 illustrates an exemplary system environment for the claimed invention.

FIG. 1 illustrates an exemplary system environment 100 for the claimed invention. FIG. 1 shows a server 102, a network 104 and a client 106. The server 102 may be a desktop computer, a workstation, or a similar server side system known to those skilled in the art as having resources that need to be managed, such as disk space, applications, and CPU processing load. The server 102 may further include a memory and a processing unit, both of which are well-known in the art and are thus omitted for purposes of clarity. The system environment 100 is based on the Common Information Model (CIM), defined and published by the Distributed Management Task Force (DMTF; web page located at http://www.dmtf.org). The CIM allows different parties in a network to exchange management information about managed entities, and also provides means to actively control and manage these entities. A related standard, Web-Based Enterprise Management (WBEM, also defined by DMTF), defines a particular implementation of CIM, including protocols for discovering and accessing such CIM implementations.

The server 102 further includes a CIM object manager 108, a logging service 110, a log storage 112, a repository 114, and an operating system 116. In the present embodiment, the CIM object manager 108 may be a WBEM compliant manager that manages CIM objects. As used here, an object is a computer representation or model of a managed resource of the server 102, such as a printer, processor, or disk drive. Server resources are represented as object-oriented classes written in an object-oriented programming language, such as C++ or Java. The client 106 requests information about a server resource from the CIM object manager 108, which in turn obtains the information from the repository 114, a central storage for CIM classes and instance definitions. The repository 114 can be present either on the server 102 or in a remote location. Other components in the server 102 are the operating system 116, which may be any operating system providing computing or data processing capabilities, and the logging service 110, a process for performing logging operations such as storing data related to transactions, operations, and events that occur during the runtime of the server 102 and its components, such as the CIM object manager 108. A device or a set of devices, collectively called the log storage 112, stores data collected during logging operations performed by the logging service 110, and may be any storage device, such as a magnetic disk, magnetic tape drive, optical disk drive, or semiconductor memory (e.g., RAM, ROM, EPROM, SRAM, DRAM, etc.).

The server 102 is connected to the client 106 via the network 104, which may include one or more networks such as a local area network (LAN), a wide area network (WAN), and the internet.

The client 106 is a client-side computing device, which could be a desktop computer, a laptop, a workstation, a personal digital assistant or the like. In the typical operating environment of FIG. 1, the client 106 includes a memory 118, a processor 120, I/O devices 122, and a network interface 124. The I/O devices 122 could include a keyboard, mouse, display monitor, printer, or other such devices known in the art, and the network interface 124 connects the client 106 with the network 104. In one aspect of the invention, the client 106 may be a CIM configured client that implements standards and techniques to manage resources located at a resource provider, such as a server.

In addition to data, a client application 126 is stored in the memory 118, the client application 126 being a software application configured to analyze and manage resources in the server 102 in the typical operating environment of FIG. 1. The client application 126 manages various aspects of the client device, such as software applications, disk space (including space availability and partitions), processor load, event processing, date, time, and ports, and may further manage devices associated with the server 102 such as disks, modems, remote I/O, tape drives, and network interfaces.

A part of the memory 118 forms a cache 128. When data is required by the client 106, the client 106 first checks the cache 128, and if the data is present in the cache 128, a cache hit occurs. Alternatively, failure to find the data in the cache 128 is referred to as a cache miss, which causes the cache 128 to query the required data from the server 102, and to store that data in the cache 128. The cache 128 maintains data based on well-known cache operations principles of spatial locality and temporal locality. When the cache 128 is full, requiring the input of new data, some old data may be purged based on a replacement policy, such as Least Recently Used (LRU) method, which purges the least recently used data. A number of other such policies are known in the art, such as first-in-first-out and random replacement policies.

It should be understood from the outset that the following material presumes that the cache systems under discussion all conform to the following "standard" characteristics. First, a cache consists of different data sets, each of which can be queried separately and uniquely from the server. Second, each data set is referred to as a cache element, possessing associated metadata including a time attribute and historical data. An alternate memory location, such as a main memory of the client, can be employed to store the historical data.

Generally, when a cache miss occurs for an object, the client polls the server for the object and adds the object to the cache. Once a cache is full, objects perceived to be rarely accessed are purged from the cache and are replaced with new objects that are required and fetched from the server. Those of skill in the art will be able to modify the disclosures as required to adapt the same to cache structures operating differently from the regime set out above.

Figure 2:
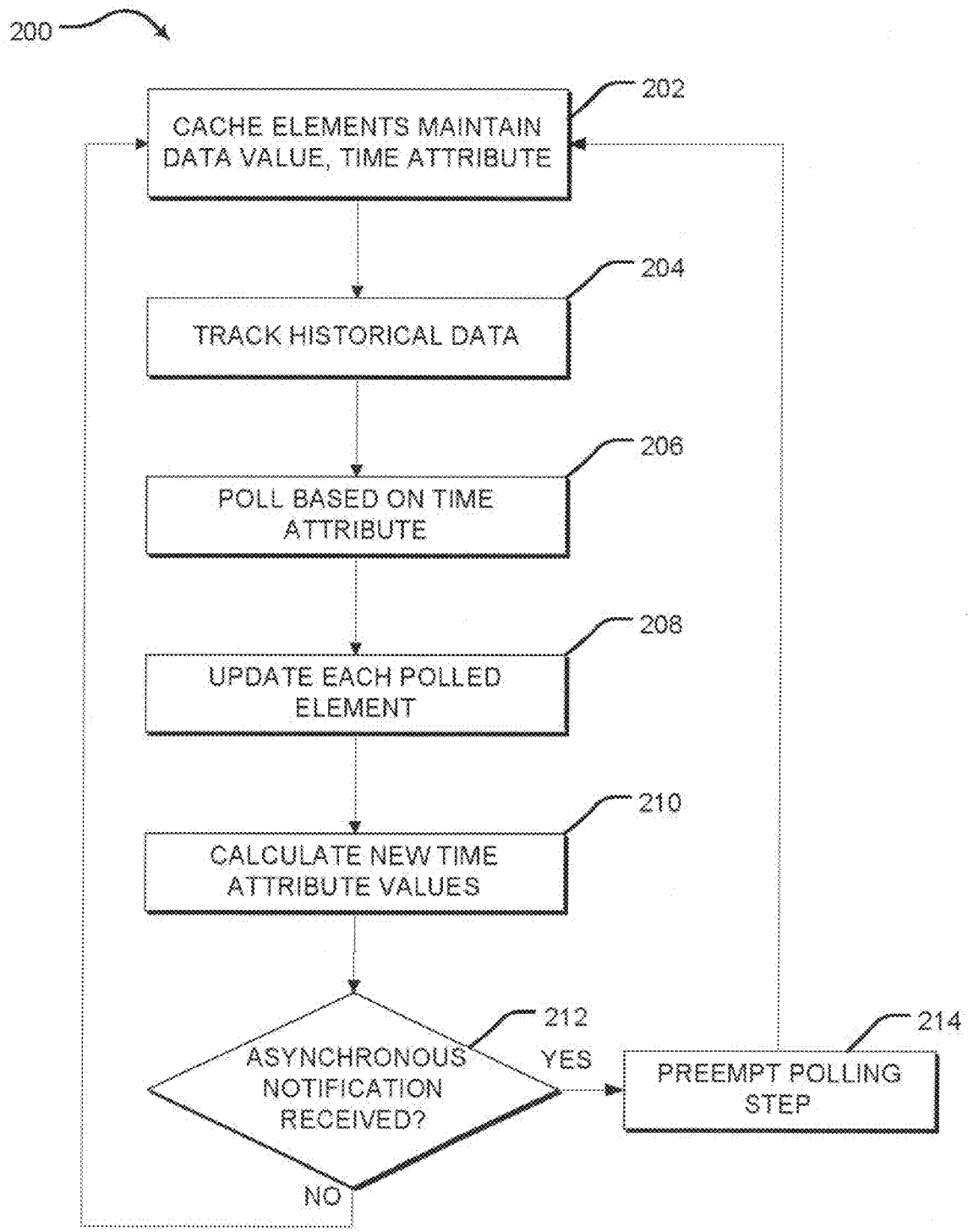
FIG. 2 illustrates a flowchart of an embodiment of a method for management of a cache.

FIG. 2 charts a method 200 for managing a cache. There, at step 202, the cache elements maintain a fetched object and its associated metadata. The method 200 tracks historical data for each cache element, including a frequency of access and a frequency of change, as shown at step 204. The time attribute maintained by a cache element indicates the time at which the object in the cache element becomes stale and should be refreshed. The server is polled during a polling thread in order to refresh stale objects in the cache elements. At step 206, the client polls for all the stale cache elements, which are identified by using the time attributes associated with the cache elements. Each of the stale cache elements is updated from the server at step 208.

The historical data is used to change the time attribute value. Generally, the polling frequency for a given element should depend on the frequency of change and the frequency of access of the element. For example, a cache element that rarely changes should not be polled as frequently as one which changes often. Unnecessary polling requires overhead, wasting network bandwidth and increasing computational effort. Because a cache element's time attribute indicates the time at which the cache element becomes stale, that time attribute should be altered to reflect the historical behavior of the cache element. For example, the time attribute value can be a time interval that conveys the amount of time a cache element can remain in the cache without being refreshed, and at the end of this time interval, the cache element is fetched from the server. Further, if the cache element is perceived as frequently changing, the associated time attribute should be reduced, resulting in a higher refresh frequency for the cache element. At step 210, new time attribute values are calculated for all the cache elements in the cache, taking into account the historical data and the present time attribute value.

Method 200 employs asynchronous notifications to keep the cache in the client coherent with the server. At any point, if an asynchronous notification is received, as shown at step 212, the cache element(s) affected by the asynchronous notification are marked as stale and refreshed at the next polling thread, irrespective of the time attribute associated with the cache element. At step 214, the polling step based on the time attribute of a cache element is preempted for the affected cache elements, and their historical data is also changed accordingly. As long as no asynchronous notification is received, the method 200 proceeds as usual.

Figure 3A:
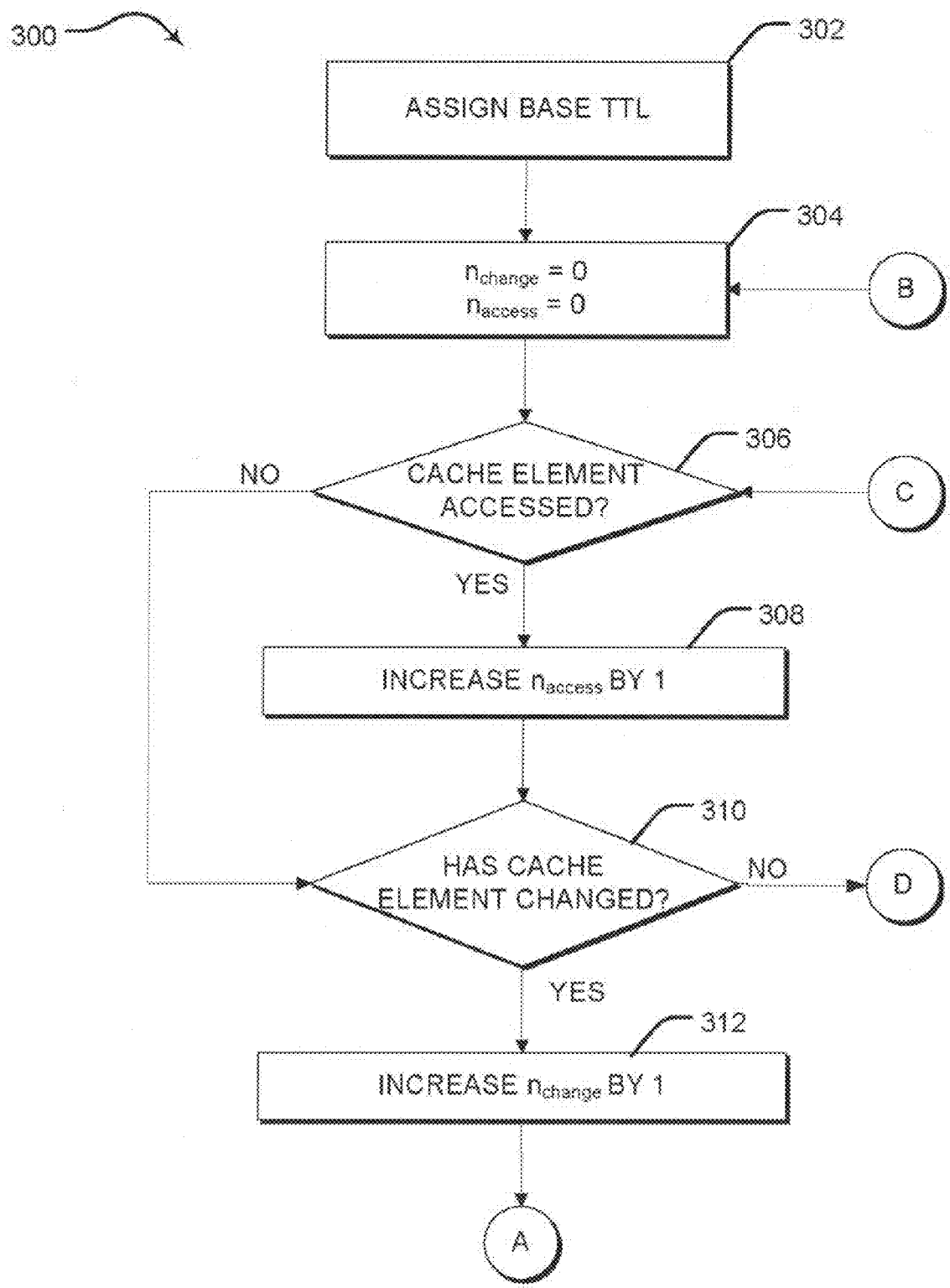
FIGS. 3A and 3B illustrate a flowchart of an exemplary embodiment of a method for cache management in a client server environment.
Figure 3B:
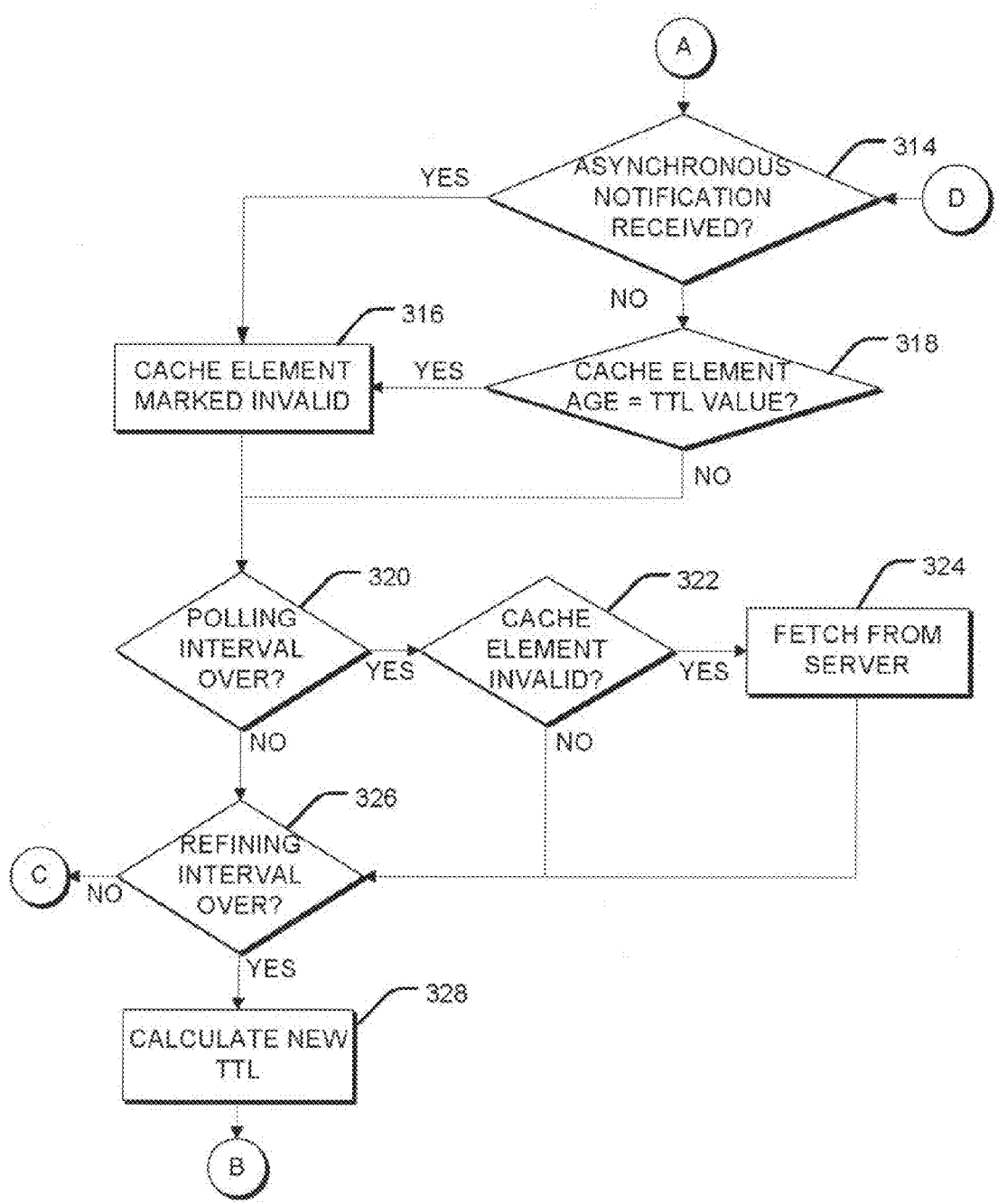

Referring now to FIGS. 3A and 3B, a flowchart illustrates an examplary embodiment of a method 300 for cache management in a client server environment. This embodiment presumes that each cache element possesses associated metadata including a Time To Live (TTL), which determines a polling frequency for that cache element. The following terms are used throughout this document and are defined here for clarity and convenience.

TTL (Time To Live): The time interval for which the cache element is active in the cache. At the end of this time interval, the cache element is invalidated and must be fetched again by polling the server. The TTL value of each cache element is continuously refined by an algorithm using the cache element's historical data and the present TTL value.

Polling interval: The time between successive polling cycles. After each polling interval, a polling thread is activated; the polling thread fetches only invalidated cache elements, thus reducing the number of polling requests made to the server.

Refining interval: Time between successive iterations of a refining algorithm, which refines TTL values for each cache element. Typically, the refining interval is greater than the polling interval.

Base TTL value: The initial TTL value assigned to a cache element. The base TTL values may be assigned from a configurable properties file, where a client application can specify its own initial base TTL value for each cache element depending on the perception and expectation of the behavior, as well as the expected usage of the cache element.

Maximum tolerance value: The maximum upper bound for the TTL. This value specifies the longest time that a cache element can remain in the cache without being refreshed. In one embodiment, the maximum tolerance value is specified by a consumer. The consumer is a CIM client application which queries data from the server.

The polling interval, the refining interval, the base TTL values, and the maximum tolerance values are configurable, and can be defined by the designer of the system based on knowledge of the system characteristics and behavior.

In addition to maintaining the TTL for each cache element, each cache element also maintains historical data about a frequency of change and a frequency of access of the cache elements. The historical data may be present in an alternate memory location, such as a main memory of the client. These statistics are used to refine the TTL and include the following exemplary categories:

Frequency of change: Objects that change more often than others need to be fetched from the server more frequently. As a result, the TTL of frequently changing objects in the cache should decrease. Here, the count of the number of times a cache element changes is given by the variable $n_{change}$.

Importance of an object: Objects queried frequently by an application are deemed important objects. The TTL for such objects will be smaller, resulting in more fetches from the server for these objects. The variable $n_{access}$ represents the number of queries submitted for an object during a refining interval and is referred to as the frequency of access.

Consider an example of a storage management solution managing a disk drive. The status of the disk drive may be 'normal' at first. If the disk is pulled out of service, the status becomes 'offline'. Once the disk is put back in service, the status may become 'warning' or 'error'. As can be seen from this example, the status of a disk drive is an object that changes frequently, while other properties like serial number or total capacity of the disk do not change as much. Such objects can be differentiated using the parameters $n_{change}$ and $n_{access}$.

Returning to the flow of the method 300, a base TTL value is assigned to a cache element when it is first fetched from the server, as shown at step 302. For a cache element fetched for the first time, $n_{change}$ and $n_{access}$ are 0, as shown at step 304. Steps 306 and 308 show that $n_{access}$ increases by one each time the cache element is accessed, and alternatively, if the cache element is not accessed, step 308 is skipped and the method 300 continues. Similarly, steps 310 and 312 show that each time the cache element changes, $n_{change}$ also increases. Whenever an object is fetched from the server, that object is compared with the corresponding cache element, and if the object has changed, $n_{change}$ for the corresponding cache element increases by one. Again, step 312 is skipped in case the cache element does not change and the method 300 continues as shown in the FIG. 3A.

At any point, if an asynchronous notification is received that affects the cache element at step 314, the cache element is likewise marked invalid, regardless of its TTL, as shown at step 316; otherwise the method 300 continues to step 318. Age of a cache element indicates the amount of time the cache element has spent in the cache without being refreshed from the server. Step 318 shows that if the age of a cache element becomes equal to the TTL (i.e., the TTL time period expires), the cache element is marked invalid, as shown at steps 316. If at step 318, the cache element's age does not equal the TTL of the cache element, the cache element is not marked invalid and the method 300 proceeds to step 320. Once the polling interval is complete (step 320), the invalid cache elements (decided at step 322) are fetched from the server at step 324, and updated in the cache. At step 326, after the refining interval is over, a new TTL is calculated for each cache element (step 328), and the $n_{change}$ and $n_{access}$ values are reset to 0.

Further, at step 320 if the polling interval is not over, and additionally, the refining interval is not over, the method 300 loops back to step 306, continuing to track the historical data. Steps 322, 324, and 326 also show that once the refining interval is reached, new TTL values are calculated for all cache elements in the cache.

It can be observed that if a cache element is not invalid, that cache element is not fetched from the server. As a result, the cache elements polled for during a polling thread are limited to invalid cache elements. In other words, only those cache elements that are perceived as requiring an update are fetched from the server. This limitation considerably reduces traffic between the server and the client.

Calculating a new TTL for each element at the end of the refining interval prevents unnecessary fetches from the server for cache elements that are not frequently accessed or changing. A further aim of an adaptive TTL is to ensure that important or frequently changing cache elements are updated regularly, to avoid stale object data in the cache. The new TTL should reflect the change and access characteristics of the cache elements, resulting in a shorter TTL if the cache element is frequently changing or accessed, and conversely, resulting in a longer TTL if the cache element is rarely changed or accessed.

In the present embodiment, the new TTL is calculated using the following formula:

$$TTL_{new} = TTL_{current} - (const_{change} * (n_{change} - N_{changeMax}/2)) - (const_{access} * (n_{access} - N_{accessMax}/2)) \quad (1)$$

where $TTL_{new}$ is the new TTL, the $TTL_{current}$ is the current TTL before it is changed, $const_{change}$ and $const_{access}$ are constants, $N_{changeMax}$ is the maximum allowable value of $n_{change}$ and $N_{accessMax}$ is the maximum allowable value of $n_{access}$.

The constants are predetermined. They may, however, vary according to the nature of the object. In a further embodiment, the constants can be adaptive, depending on the importance or change characteristics of the object. CIM is an object-oriented model that includes implicitly related objects. For example, a disk drive has various facets represented by classes, the facets being physical elements, logical elements, operational status, and so on. Different objects representing these facets are inherently related and share change characteristics. For a particular disk, physical entities like the disk serial number do not change, and so the base TTL value and the constants for such a cache element can be assigned accordingly. Similarly, implicit relationships between different objects extend to access characteristics as well. If a cache miss occurs for an object at the client end, related objects can also be fetched from the server in addition to the object and assigned similar base TTL values, constants, and so on.

Those skilled in the art, however, will recognize and appreciate that the specifics of this example embodiment are merely illustrative and that the teachings set forth herein are applicable in a variety of alternative settings. For example, formula (1) can be replaced by another formula or algorithm to serve the same purpose of making the polling process adaptive. The embodiments of the cache management method and system are not limited to the CIM environment. Other alternative implementations incorporating the use of different types of systems and devices are contemplated and lie within the scope of the various teachings described, especially where the following three criteria are observed: (a) in order to satisfy one request, the client needs to access the server multiple times resulting in a large amount of traffic between client and server; (b) asynchronous notifications are present in the system; and (c) the cache has multiple consumers that require different attributes of the same data and some attributes get used more often than others.

EXAMPLE 1

Consider an example where base TTL=50 and $n_{change}$=0 (the cache element has never changed during the refining interval). These values indicate that the cache element is stable and can remain in the cache for a longer period without being updated. As a result, the TTL should increase. Assume that $const_{change}$=0.1, the lower bound of $n_{change}$ is 0 and $N_{changeMax}$ is 100. Applying only the first portion (i.e., the change portion) of formula (1), while leaving off the access portion for ease in explanation, the new TTL value is calculated as follows:

$$TTL = 50 - (0.1*(0 - 100/2)) = 50 + 0.1*50 = 55$$

With $const_{change}$ value as 0.1, if there is no change in the cache element for 10 refining intervals, the TTL reaches 100 and will only be fetched again after the maximum tolerance value has been reached. Alternatively, if the $const_{change}$ value is 1, the TTL increases by 50 in the above example and reaches maximum tolerance value in a single refining interval. The values of the constant can vary between 0 and 1 in the above example, because for value 0 there is no change in TTL, and for value 1, the TTL reaches the maximum tolerance value from base TTL. Table 1 illustrates the variation in TTL in response to various values of $const_{change}$:

TABLE 1

| Base TTL | $N_{changeMax}$ | $n_{change}$ | $const_{change}$ | New TTL | Number of refining intervals in which TTL will reach 100 |
|---|---|---|---|---|---|
| 50 | 100 | 0 | 0.01 | 50.5 | 100 |
| 50 | 100 | 0 | 0.1 | 55 | 10 |
| 50 | 100 | 0 | 0.5 | 75 | 2 |
| 50 | 100 | 0 | 0.9 | 95 | 1.111111111 |
| 50 | 100 | 0 | 1 | 100 | 1 |

When using the entire formula (1), the lower bound for $n_{change}$ and $n_{access}$ is 0, and $N_{changeMax}$ and $N_{accessMax}$ are 100. If during the refining interval there are more than 100 queries for a cache element, then also $n_{access}$ value for the cache element is set to 100.

EXAMPLE 2

Figure 4:
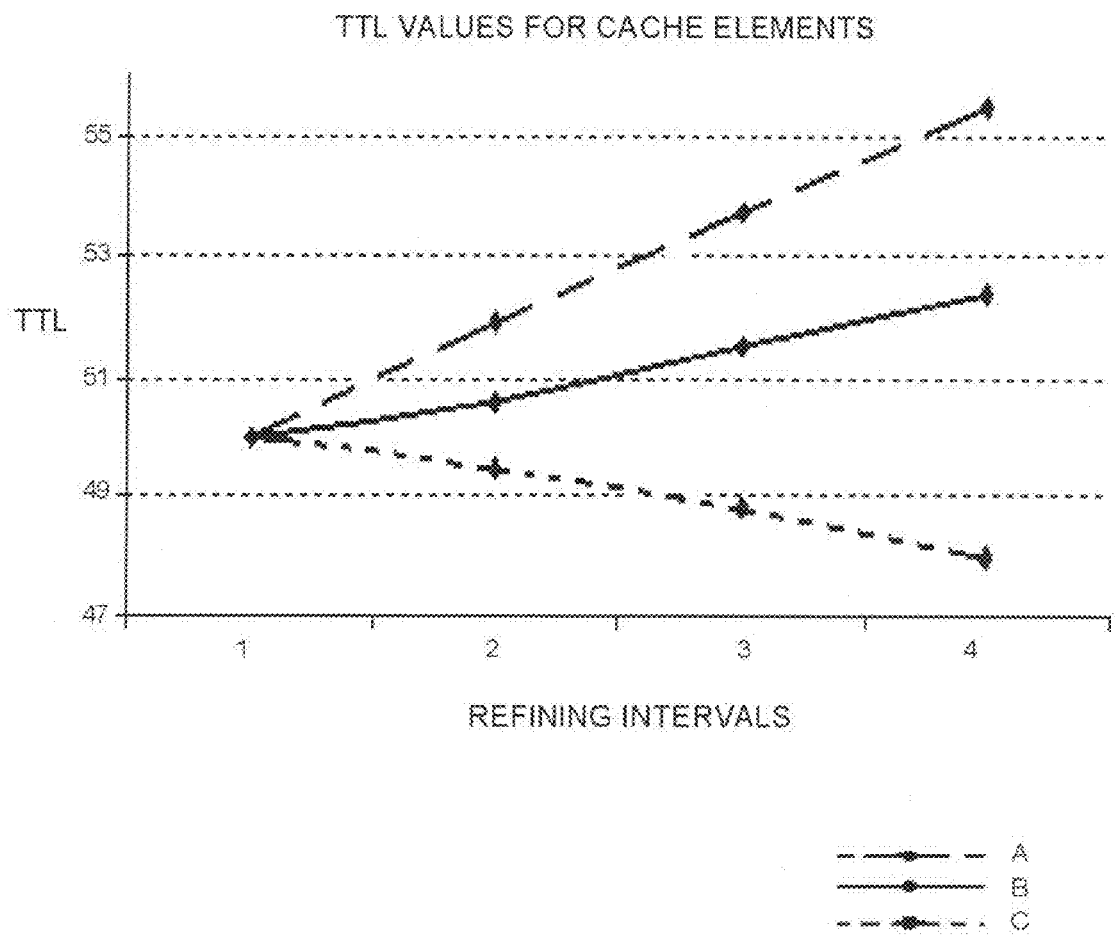
FIG. 4 charts the change in TTL values at different refining intervals.

In this example, three cache elements are analyzed to assess how the above referenced formula (1) operates on cache elements with different change and access characteristics. FIG. 4 charts the change in TTL values of the cache elements A, B, and C analyzed in Example 2 at different refining intervals. Table 2 details the specific values shown in FIG. 4, where $const_{change}$ and $const_{access}$ are both 0.02 in this example.

Cache element A is comparatively non-changing and is not accessed often by the client. As a result, the TTL of A increases so that it does not have to be fetched as often.

Cache element B is also relatively non-changing, but it is accessed frequently by the client. This fact makes it an important element, and thus the TTL of element B is shorter than that of element A.

Cache element C is observed as changing frequently and is also accessed often by the client. Consequently, the TTL of C is short and the cache element C is fetched often from the server.

TABLE 2

| | | Refining Interval | | | |
|---|---|---|---|---|---|
| | | 1 | 2 | 3 | 4 |
| Cache element A | $n_{access}$ | | 5 | 4 | 8 |
| | $n_{change}$ | | 0 | 5 | 4 |
| | TTL | 50 | 51.9 | 53.72 | 55.48 |
| Cache element B | $n_{access}$ | | 60 | 53 | 51 |
| | $n_{change}$ | | 11 | 1 | 5 |
| | TTL | 50 | 50.58 | 51.5 | 52.38 |
| Cache element C | $n_{access}$ | | 70 | 76 | 81 |
| | $n_{change}$ | | 58 | 55 | 61 |
| | TTL | 50 | 49.44 | 48.82 | 47.98 |

If the TTL for a cache element reaches the maximum tolerance value or remains at the maximum value for a predetermined number of refining intervals, the cache element is removed from the cache.

Figure 5:
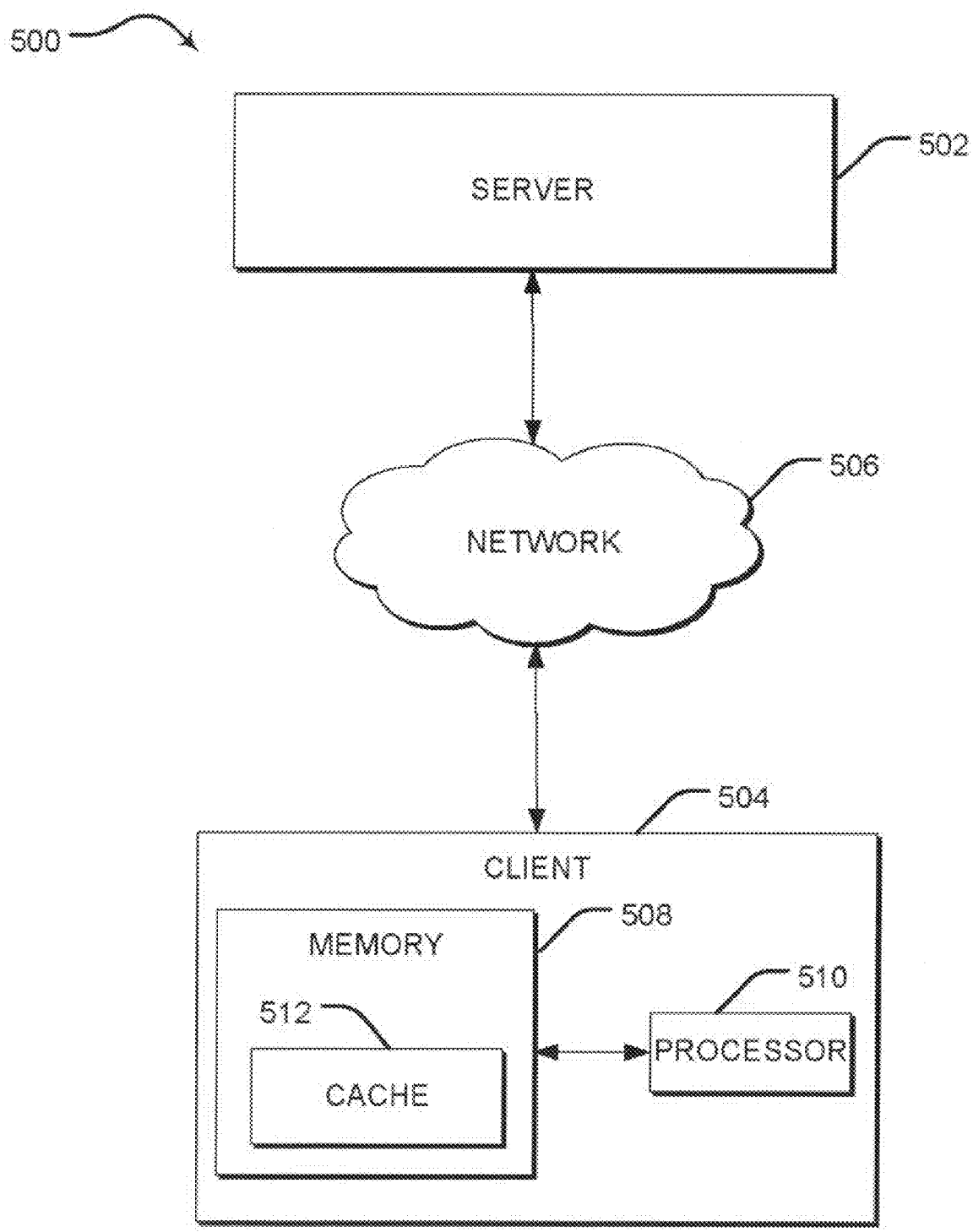
FIG. 5 shows a system for cache management based on the CIM, embodying the claimed invention.

FIG. 5 shows a system 500 for cache management based on the CIM, embodying the claimed invention. This embodiment exists in a client-server environment, a server 502 being connected to a client 504 via a network 506. The client 504 maintains a memory 508 having objects and classes associated with the hardware and software applications, and a processor 510, among other elements and functionalities (omitted for purposes of clarity). The client 504, having a cache 512 containing several cache elements, fetches required data from the server 502, and stores it in the cache 512 as cache elements. Each cache element also maintains a time attribute and historical data associated with the cache element. The historical data may be present in an alternate memory location, such as main memory of the client 504.

Besides polling the server 502 at predetermined time intervals for cache elements having a time attribute value that lies in a selected range, the processor 510 also tracks the historical data of each cache element. The polled cache elements are updated with the new data values fetched from the server 502. Additionally, the processor 510 performs calculation of new values of the time attribute for each cache element using the corresponding historical data and the present time attribute value associated.

In a further embodiment, the processor 510 calculates the new values of the time attribute at the end of a refining interval, which can be predefined. The resultant new values of the time attribute allow the polling frequency for each cache element to vary according to the nature of corresponding cache element. The processor 510 may store the new values of the time attribute in the corresponding cache elements. Besides polling, a cache element may be updated on receiving an asynchronous notification by the processor 510. The asynchronous notification preempts the polling for the cache element based on its time attribute value and instead polls for the cache element based on the asynchronous notification. The preemption may involve marking the cache element as being stale so that the cache element is refreshed the next time the server is polled, irrespective of the time attribute associated with the cache element.

The terminology used herein describes particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing cache elements in a data processing system having at least one processor and at least one cache, each cache element having associated therewith data, Time to Live (TTL), frequency of change ($n_{change}$), and frequency of access ($n_{access}$), the method comprising:
    setting a polling interval and a refining interval;
    storing each cache element in the cache and assigning a base value to the TTL for each cache element fetched for a first time;
    managing each cache element according to the following steps:
    (a) setting $n_{change}$ and $n_{access}$ to zero for the cache element;
    (b) tracking historical data, comprising $n_{change}$ and $n_{access}$, for the cache element by incrementing $n_{change}$ each time the cache element is changed and incrementing $const_{access}$ each time the cache element is accessed;
    (c) in response to expiration of the TTL for the cache element, marking the cache element invalid;
    (d) in response to expiration of the polling interval and to the cache element being marked invalid, polling for the cache element to obtain new data for the cache element and updating the cache element with the new data;
    (e) in response to expiration of the refining interval, computing a new TTL for the cache element based on the historical data and current TTL for the cache element and returning to step a; and
    (f) returning to step b.

2. The method of claim 1, wherein the cache elements have further associated therewith a maximum tolerance value, maximum allowable accesses ($N_{accessMax}$), maximum allowable changes ($N_{changeMax}$), and first and second constants ($const_{change}$ and $const_{access}$, respectively) having values selectable between a predetermined range, wherein the new TTL ($TTL_{new}$) in step e is computed according to the following formula:

$$TTL_{new}=TTL_{current}-(const_{change}*(n_{change}-N_{changeMax}/2))-(const_{access}*(n_{access}-N_{accessMax}/2)).$$

3. The method of claim 2, wherein the predetermined range is between 0 and 1.

4. The method of claim 1, further comprising
    immediately after step b and before step c, in response to receiving an asynchronous notification for the cache element, marking the cache element invalid and jumping to step d.

5. The method of claim 1, wherein step d further comprises:
    polling for the cache element in a server to obtain the new data for the cache element from the server.

6. The method of claim 1, wherein the setting step and steps a through f are performed by the processor.

7. The method of claim 1, wherein the historical data relating to the cache element is stored in the cache element.

8. The method of claim 2, further comprising:
    in step c, marking the cache element invalid if the TTL equals or is greater than the maximum tolerance value for the cache element.

9. The method of claim 1, wherein in step b, $n_{change}$ and $n_{access}$ are incremented by one each time the cache element is changed or accessed, respectively.

10. The method of claim 1, wherein the refining interval is greater than the polling interval.

11. A system for managing cache elements, having associated with each cache element data, Time to Live (TTL), frequency of change ($n_{change}$), and frequency of access ($n_{access}$), the system comprising:
    a server having data elements stored in a memory;
    a client;
    a cache in the client configured to store at least one cache element; and
    a processor in the client configured to perform the following steps for managing each cache element:
    (a) setting a polling interval and a refining interval;
    (b) assigning a base value to the TTL for the cache element fetched for a first time;
    (c) setting $n_{change}$ and $n_{access}$ to zero for the cache element;

(d) tracking historical data, comprising $n_{change}$ and $n_{access}$, relating to the cache element by incrementing $n_{change}$ by one each time the cache element is changed and incrementing $const_{access}$ by one each time the cache element is accessed;

(e) in response to expiration of the TTL for the cache element, marking the cache element invalid;

(f) in response to expiration of the polling interval and to the cache element being marked invalid, polling the memory in the server to obtain new data for the cache element and updating the cache element with the new data;

(g) in response to expiration of the refining interval, computing a new TTL for the cache element based on the historical data and a current TTL for the cache element and returning to step c; and (h) returning to step d.

12. The system of claim 11, wherein the cache elements have further associated therewith a maximum tolerance value, maximum allowable accesses ($N_{accessMax}$), maximum allowable changes ($N_{changeMax}$), and first and second constants ($const_{change}$ and $const_{access}$, respectively) having values selectable between a predetermined range, wherein the new TTL ($TTL_{new}$) in step g is computed according to the following formula:

$$TTL_{new}=TTL_{current}-(const_{change}*(n_{change}-N_{changeMax}/2))-(const_{access}*(n_{access}-N_{accessMax}/2)).$$

13. The system of claim 12, wherein the predetermined range is between 0 and 1.

14. The system of claim 11, wherein the historical data relating to the cache element is stored in the cache element.

15. The system of claim 12, further comprising:
in step e, marking the cache element invalid if the TTL equals or is greater than the maximum tolerance value for the cache element, thereby indicating that the TTL has expired.

16. The system of claim 11, wherein the refining interval is greater than the polling interval.

\* \* \* \* \*